Dec. 16, 1941.    I. JEPSON    2,266,708

SADIRON

Original Filed Aug. 30, 1935

Inventor:
Ivar Jepson
By
McCanna, Wintercorn & Morsbach
Attys.

Patented Dec. 16, 1941

2,266,708

UNITED STATES PATENT OFFICE 2,266,708

SADIRON

Ivar Jepson, Chicago, Ill., assignor to Chicago Flexible Shaft Company, Chicago, Ill., a corporation of Illinois Original application August 30, 1935, Serial No. 38,533. Divided and this application October 31, 1941, Serial No. 417,289

10 Claims. (Cl. 219—25)

This application is a division of my application Serial No. 38,533, filed August 30, 1935, for Sadiron.

The invention relates to electric sadirons of the automatic type adapted for domestic use and having thermostat mechanism for controlling the supply of electric current to the heating element.

The present invention has for its main object the provision of improved means for adjusting the thermostat mechanism.

Furthermore, the invention aims to provide an improved sadiron having a novel handle structure and manually operable temperature adjustment means incorporated therein. More particularly, I have provided a manually operable member mounted in a heat insulated part of the handle for convenient access while operating the iron.

Another object of my invention is the provision of a wheel type control member housed in the handle structure and having a peripheral portion containing notations showing actual temperature settings corresponding with the position of the wheel, the notation containing portion being accessible for quick and convenient operation as by means of the thumb or forefinger of the hand while holding the iron or ironing.

Another object of my invention is the provision of a sadiron having improved temperature adjusting means so designed in coaction with the handle structure and the temperature adjusting means as to be substantially protected against mechanical damage and accidental displacement.

Figure 1:
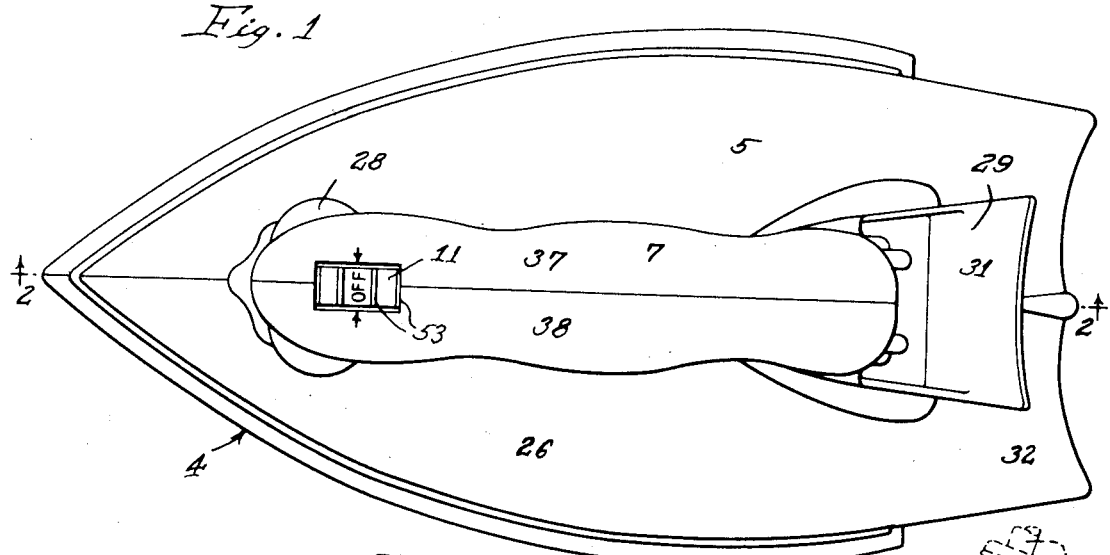
Figure 2:
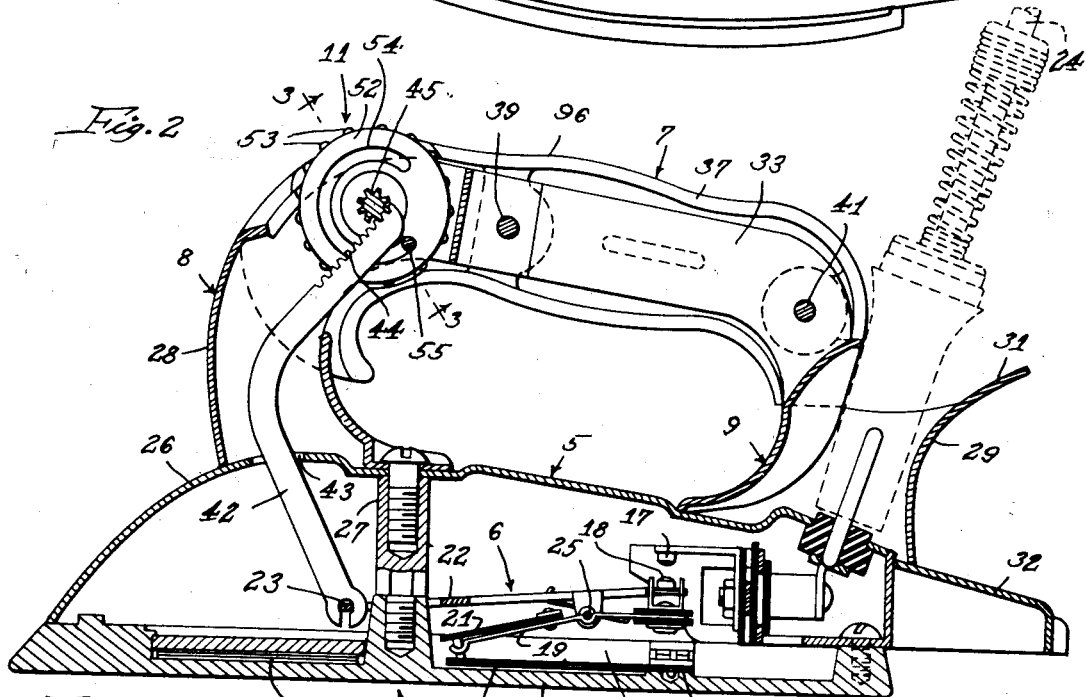
Figure 3:
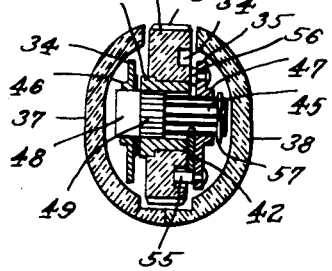

Other objects and attendant advantages will be apparent from the following description and the following drawing, in which Figure 1 is a top view of a sadiron embodying my invention;

Fig. 2 is a vertical section taken longitudinally through the iron along the line 2—2 of Figure 1; and Fig. 3 is a section on the line 3—3 of Fig. 2.

The invention contemplates, though it is not necessarily limited to a light weight sadiron having a heating element in close proximity to the ironing surface thereof so that this surface very rapidly responds to the heating effect of the heating element, the action of the heating element being controlled by a thermostat so constructed as to control the heating element so as to maintain the ironing surface at the proper temperature to prevent this temperature from either overrunning at certain times as is common in sadirons of the prior art, or in turn dropping below a satisfactory ironing temperature when placed in service. The sole plate heating means and the thermostat mechanism for controlling the temperature of the iron may be of any suitable or desired construction consistent with the present invention. The invention contemplates improved thermostat control mechanism, particularly as incorporated in an improved handle structure. It further contemplates the general organization of the iron to accomplish the results mentioned.

Directing attention first to the drawing which shows a preferred embodiment of the invention, the numeral 4 designates generally the sole plate of the iron, the numeral 5 designates a shell covering the sole plate, the numeral 6 designates a thermostatic mechanism located above the sole plate and within the shell, the numeral 7 indicates the handle of the iron, the numerals 8 and 9 designate generally handle supports for attaching the handle to the iron, and the numeral 11 designates generally manual control means for the thermostatic mechanism. The sole plate has an ironing surface 12 on the underside and in the embodiment here shown the sole plate is heated by an electric heating element 13 positioned on top of the plate between the marginal walls thereof so as to cover substantially the entire area therebetween except for a thermostat recess or well 14 located centrally between the marginal side walls. In this case a bimetallic thermostat blade 15 is located in the well 14 and fastened to the sole plate at 16 so that upon increasing temperature the free end of the thermostat moves upwardly away from the bottom of the well. This movement of the thermostat is utilized for opening a suitable switch having stationary and movable contacts 17 and 18, respectively. This switch controls the flow of electric current to the heating element. The heating and cooling function of the thermostat serves to automatically cause opening and closing the heating circuit. An adjustment is provided by means of which the operator may set the control mechanism to obtain different ironing temperatures according to the needs of the work. Any suitable or desired thermostat mechanism may be employed with the present invention, that shown being described and illustrated more fully in my above mentioned application. It will suffice to say that the mechanism here shown includes a switch lever 19, a secondary or compensating thermostat blade 21 associated with said lever 19, and a switch yoke or lever 22 also associated with said lever 19. The switch yoke 22 is adapted to be moved upwardly and downwardly at its forward end 23 to effect closing and opening of the contacts 17—18 and also to change the temperature setting of the thermostat mechanism. Electric current is supplied to the heater circuit by suitable means such as through an electric cord 24. The operation of this thermostat mechanism is briefly as follows: The parts are shown in Fig. 2 with the switch yoke 22 set in its lowermost position, thereby holding the contacts open, this being the normal "off" position of the control. By moving the forward end of the switch yoke 22 upwardly to a given position the contacts will be closed, thereby causing electric current to flow through the heating element. When a predetermined temperature has been reached, depending on the particular setting of switch yoke 22, the thermostat mechanism will open the contacts and thereafter will recurrently close and open the contacts as the iron cools and heats, thereby maintaining the desired ironing temperature. More particularly, when the thermostat blade 15 warps upwardly it will, at a predetermined temperature, impart movement to the switch lever 19 in a clockwise direction about its pivot 25 on the yoke or lever structure 22, thereby withdrawing the contact 18 from the stationary contact 17. Adjustment of the switch yoke 22 changes the amount of restraint to opening of the switch. It follows that the setting of the switch yoke 22 serves to control the thermostat mechanism and consequently the ironing temperature.

In this embodiment the top of the sole plate is covered by a cover shell 26, the lower edge of which has contact with the marginal side flanges of the sole plate, the cover enclosing the thermostat mechanism. The cover shell is held onto the sole plate by suitable means, such as a bolt connection 27. A hollow front handle support 28 is attached to the top of the shell, and a rear handle support 29 is also carried on the shell around the terminal posts. The rear edge of the handle support 29 projects outwardly as shown at 31 and cooperates with the overhanging portion 32 of the cover to form a heel rest for the iron. The handle support 29 has a forwardly extending strap 33 and the handle support 28 has a pair of rearwardly extending straps 34 and 35 (Fig. 3) meeting the strap 33 and being attached thereto by any suitable means, as, for example, by spot welding. The straps 33, 34 and 35 form a central support for a handle 36 and serve to support the handle on the handle supports 28 and 29. The handle 36 is preferably formed of insulating material in order that the same shall not become excessively hot. In this instance it is molded from synthetic resins in two halves 37 and 38 which are secured together by means of bolts 39 and 41 passing through the handle straps.

Means for adjusting the thermostat mechanism 6 is carried in the fore-part of the iron and includes a rod 42 passing through a narrow slot 43 in the top of the cover and attached at its lower end to the forward end of the switch yoke or lever 22, as shown at 23. The rod 42 extends upward through the hollow handle support 28 and has a rack 44 along one side adjacent its upper end. The rack cooperates with a pinion member 45 carried in openings in the straps 34 and 35, the openings being surrounded by flanges 46 and 47 which serve to provide a bearing area for the pinion member. The pinion member has a tooth portion which rides within the flange 47 and a larger bearing portion 48 which rides in the flange 46. The bearing portion 48 is knurled, as shown at 49, and cooperates with the internally knurled sleeve 51 which in turn carries a wheel 52 of insulation material, such as synthetic resin. The wheel 52 is of such diameter that it projects slightly beyond the upper edge of the handle and has annularly spaced ribs 53 to facilitate the manual rotation of the wheel. The wheel also has a groove 54 within which is received a pin 55 carried on the strap 35, the groove and pin limiting the amount of rotation of the wheel. A pin 56 in the strap 35 bears against the side of the wheel to prevent sideplay. A spring ring 57 acts to retain the pinion member in place in its bearing. It will be seen from Figs. 2 and 3 that the rod 42 passes between the pinion member and the pin 53, which engage opposite edges thereof, and between the wheel 52 and the strap 35, which prevent lateral movement of the rod, and by these means the movement of the rod is effectively guided. Upon rotation of the wheel 52 it will be observed that the pinion causes longitudinal movement of the rod 42, thereby raising or lowering the front end of the switch yoke 22 rotating the yoke about its pivotal points and thereby varying the relationship between the switch lever 19 and the thermostat blade 15. It will also be observed that calibration of the thermostat, that is, the setting of the thermostat and control mechanism so that the temperature maintained by the thermostat will correspond to that indicated on the wheel 52, is accomplished entirely outside the body of the iron and by adjusting or setting the relative positions of the rack 44, the pinion member 45 and the wheel 52. Advantageously the edge of the wheel is of such width as to carry notations either as to actual temperatures or the setting for the different materials being ironed. Attention is directed to the fact that the control for the thermostat is entirely enclosed so that there is no possibility of mechanical damage to the control mechanism which might accidentally and unknowingly change the relationship between the parts and so result in an ironing temperature different from that for which the wheel 52 is set. The wheel is located on a heat insulated part of the iron in such a position as to be conveniently accessible to the thumb of the operator and in such a position that there is no possibility of the hands of the operator coming into contact with heated portions of the iron. The action of the control is smooth and positive.

It is believed the foregoing conveys a clear understanding of my invention; and while I have shown a particular embodiment, it will be understood that I do not wish to be limited thereto since many modifications may be made. I therefore contemplate by the appended claims to cover any such modifications as fall within the true spirit and scope of my invention.

I claim:

1. The combination in a sadiron, of a body including a sole plate and a cover therefor characterized by the total lack of a member functioning primarily as a heat storage element, said sole plate having a thermostat element responsive to the temperature thereof and a heating element for heating the same, switch mechanism in the space between the sole plate and the cover actuated by the thermostat element to make and break the flow of current through said heating element, a handle having a hollow handle support attached to the cover, and means extending through the handle support for manually adjusting the thermostat from the handle.

2. The combination in a sadiron, of a sole plate, a cover therefor, a heating element for the sole plate, thermostat switch mechanism within the cover for controlling the temperature of the sole plate, a hollow handle support on the cover, and means extending through the handle support for adjusting the thermostat mechanism from the handle.

3. The combination in an electric sadiron, of a body, a thermostat mechanism in the body for controlling the temperature thereof, a handle having a hollow support on the body, and means positioned in said hollow support manually operable from the handle for adjusting the thermostat mechanism.

4. The combination in an electric sadiron, of a body, a thermostat mechanism in the body for controlling the temperature thereof, a handle having a hollow support on the body, a rotatable member on the handle, and a rack and pinion mechanism positioned within the handle acting between the rotatable member and the thermostat mechanism for manual adjustment of the latter.

5. The combination in an electric sadiron, of a body, a thermostat mechanism in the body for controlling the temperature thereof, a handle having a hollow support on the body, a rotatable adjustable member positioned in the handle and projecting therefrom for manual rotation, means positioned in the handle for transmitting motion from the rotatable member to the thermostat mechanism to adjust the same, and means for limiting the rotation of the rotatable member to predetermine the range of the thermostat mechanism.

6. The combination in an electric sadiron, of an electrically heated sole plate, mechanism for controlling the temperature of the sole plate including a rotatable member having notations showing temperature settings, a handle structure having a hand-grasp portion and a portion at the front thereof shaped to house said rotatable member in an operative position therein and having an opening through which a notation containing portion of said member is exposed for view and accessible for finger operation, said member being mounted in said position for rotative adjustment to change the temperature settings according to said notations.

7. The combination in an electric sadiron, of an electrically heated sole plate, mechanism for controlling the temperature of the sole plate including a wheel-type control member having a peripheral surface containing notations showing temperature settings spaced circumferentially over a large portion of the periphery, a handle structure having a hand-grasp portion and a portion at the front thereof shaped to house said wheel member in an operative position therein and having an opening through which a notation containing portion of the wheel member is exposed for view and accessible for finger operation, the wheel member being mounted in said position for rotative adjustment to change the temperature settings according to said notations.

8. The combination in a sadiron, of a sole plate structure, heating means therefor, a handle structure having a hand-grasp portion in heat insulated relation to the sole plate structure, and mechanism for controlling the heating means including a wheel member located in a heat insulated portion of the handle structure, the handle structure having an opening through which a peripheral portion of the wheel member is accessible for rotative adjustment by finger operation, said peripheral portion having notations showing temperature settings spaced circumferentially thereon, and means housed within the handle structure operative between the wheel member and the temperature control mechanism for transmitting rotative movement of the wheel member to change the temperature setting of said mechanism according to said notations.

9. The combination in an electric sadiron, of a body, a thermostat mechanism in the body for controlling the temperature thereof, a handle having a hollow support on the body, the handle having a hand-grasp portion and a portion located forward of said hand-grasp portion, a rotatable control member, said forward portion of the handle structure being shaped to receive said rotatable control member and having an opening through which a peripheral portion of said member is accessible, said control member being mounted in said position for rotative adjustment, means connected to said member extending through the hollow handle structure and connected with the thermostat mechanism for transmitting rotative movement of said member for changing the temperature setting of said mechanism.

10. The combination in an electric sadiron, of a body, thermostat mechanism in the body for controlling the temperature thereof, a handle having a support on the body, the handle having a hand-grasp portion and a portion located forward of said hand-grasp portion, a wheel-type control member, said forward portion of the handle structure being shaped to receive said wheel-type control member and having an opening through which a peripheral portion of said member is accessible, said wheel member being mounted in said position for rotative adjustment, means connected to said wheel-type member extending through the handle structure and connected with the thermostat mechanism for transmitting rotative movement of said member for changing the temperature setting of said mechanism, said accessible peripheral portion of the wheel member being located in co-operative relation with the hand-grasp portion so as to be conveniently operable in rotative movements by the thumb of the hand grasping said hand-grasp portion.

IVAR JEPSON.